United States Patent [19]

Johnson, III et al.

[11] 4,157,274

[45] Jun. 5, 1979

[54] PACKAGE STRAPPING DEVICE WITH FLOATING HEAT TONGUE

[75] Inventors: Eric A. Johnson, III, Crawfordsville; Melvin E. Moore, Rockville; Tom A. Budd, Crawfordsville, all of Ind.

[73] Assignee: Keystone Consolidated Industries, Inc., Peoria, Ill.

[21] Appl. No.: 912,511

[22] Filed: Jun. 5, 1978

[51] Int. Cl.² .................... B30B 15/34; B32B 31/00
[52] U.S. Cl. ................................ 156/499; 156/583
[58] Field of Search ........................ 156/583, 499

[56] References Cited

U.S. PATENT DOCUMENTS

| 3,897,296 | 7/1975 | Waldrum | 156/499 |
|---|---|---|---|
| 3,914,153 | 10/1975 | Sato | 156/499 |
| 4,016,023 | 4/1977 | Takami | 156/499 |

Primary Examiner—Douglas J. Drummond
Attorney, Agent, or Firm—Allegretti, Newitt, Witcoff & McAndrews

[57] ABSTRACT

An improved floating heat tongue and mounting device for use in conjunction with a package strapping device which forms a heat seal in overlapping portions of a plastic strap wrapped about a package. A floatable metal heat tongue mounted for vertical floating movement within a holder which is adapted to deliver heat to the heat tongue.

7 Claims, 4 Drawing Figures

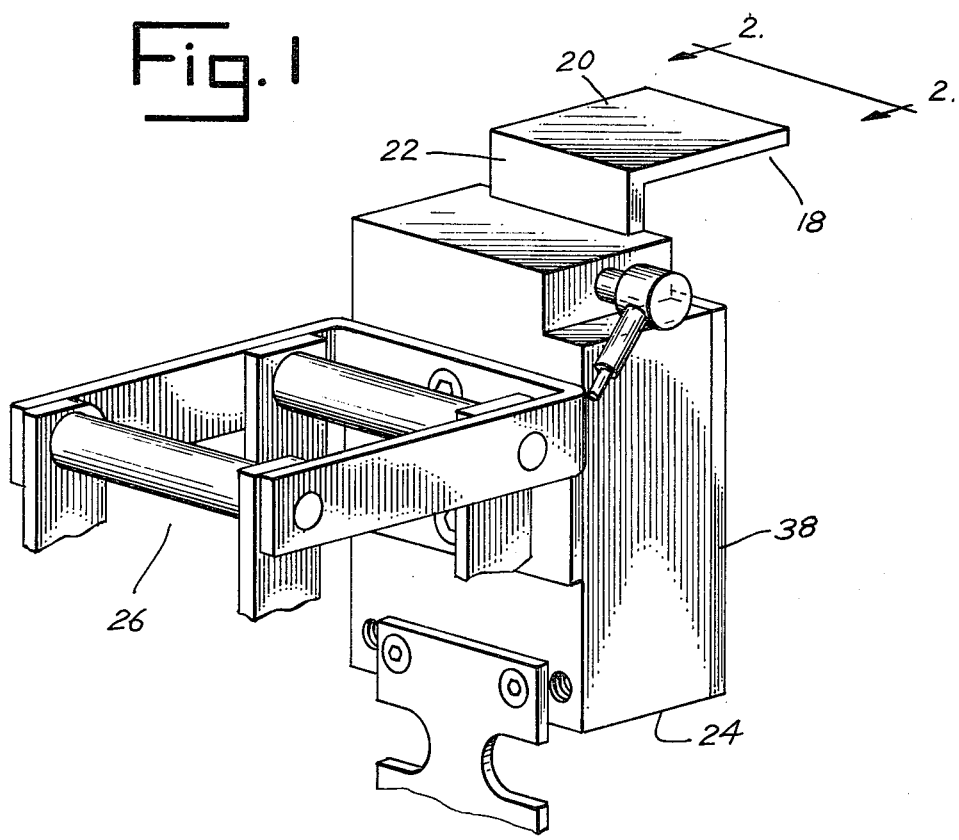
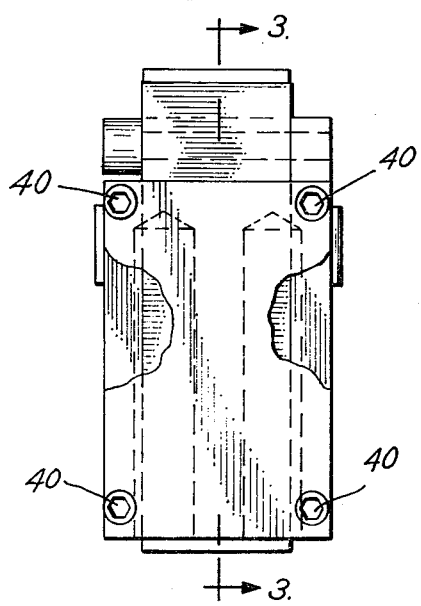
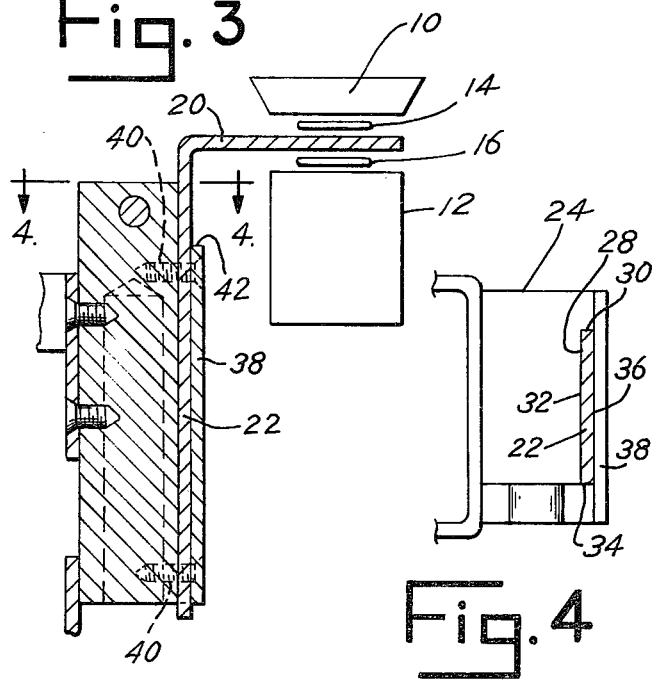

PACKAGE STRAPPING DEVICE WITH FLOATING HEAT TONGUE

BACKGROUND OF THE INVENTION

The prior heat tongues and holders of which applicants are presently aware were directed primarily toward a rigid mounting of the heat tongue in a fixed position with respect to a holder and/or heat block. The heat block and holder with the rigidly connected heat tongue extending therefrom were adapted to be moved toward a strapping station so as to interpose the heat tongue between overlapping portions of plastic strap. Pressure plates located above and below the overlapping portions of the plastic strap were then moved relatively toward one another (either one or both might be moved) so as to compress the strap with the heat tongue therebetween to heat the strap. Subsequently, one or the other or both of the pressure plates were retracted to allow the heat tongue and heat tongue holder to be withdrawn. The pressure plates were then actuated to compress the heated, overlapping strap portions to form a heat seal.

Because of the rigid position of many of the prior heat tongues with respect to the holder, the compression of the heat tongue between the pressure plates could result in unnecessary wear and damage of the heat tongue. Also, the holder and associated heating unit could be subjected to unnecessary vibration and jarring. This jarring and vibration could also result in misalignment of the heat tongue and attached holder which could then result in failure or poor performance of a heat tongue due to misalignment.

SUMMARY OF THE INVENTION

The present invention is directed to an improvement in an apparatus adapted to form a heat seal in overlapping portions of a plastic strap. Such a device is utilized in a package strapping machine using plastic strap. In the device an apparatus is provided which includes a heat tongue holder and means for advancing and retracting a holder toward and away from overlapping portions of plastic strap. Means for compressing the overlapping portions of the strap during a heat seal operation are also provided and include an upper pressure plate and a lower pressure plate with the lower pressure plate movable upwardly toward the upper pressure portion plate to compress the overlapping portions of plastic strap therebetween.

The improvement is primarily directed toward an improved floating heat tongue mounted within the heat tongue holder and heater. In a preferred embodiment the metal heat tongue has a first relatively flat run adapted to be interposed between the overlapping strap portions and a second relatively flat run forming an angle with respect to the first run. Means for mounting the heat tongue within the holder are provided in the form of a recessed channel running from an upper portion of the holder in a substantially vertical direction. The channel is adapted to slidably receive the second run of the heat tongue within the holder and has a cross section complimentary to and just slightly larger than the cross section of a second run of a heat tongue. The second run of the heat tongue is inserted into the channel and the first run abuts an upper portion of the holder to limit further downward movement of the heat tongue. In this way the heat tongue is maintained in a fixed predetermined position in relation to the holder so that when the holder is advanced to interpose the first run of the heat tongue between overlapping portions of the plastic strap, the heat tongue is properly located. Also, the heat tongue is then free to slide vertically between compressed portions of the overlapping plastic strap with the relative movement of the pressure plates. Moreover, the heat tongue is then free to automatically return to its fixed predetermined position in the holder after the holder is withdrawn from proximity of the overlapping strap portions.

Accordingly, it is an object of the present invention to provide an improved heat tongue and holder arrangement for a package strapping device for use with plastic strapping.

It is a further object of the present invention to provide such an improvement in which the heat tongue will be capable of being simply and easily inserted into the heat tongue holder.

It is yet a further object of the present invention to provide a mounting for the heat tongue and to provide a heat tongue in such a manner that the heat tongue is floatably mounted within the holder to permit free vertical movement of the heat tongue during operation.

It is still a further object of the present invention to provide such a device in which the heat tongue will be automatically returned to a predetermined position after a heat seal operation. Still a further object of the present invention is to provide a means for mounting the heat tongue which will be simple and economic to construct, operate and maintain.

These and other objects of the present invention will be more readily apparent by reference to the detailed description which follows.

BRIEF DESCRIPTION OF THE DRAWINGS

There follows a brief description of the drawings showing a presently preferred embodiment of the present invention in which like numerals refer to like elements and in which:

FIG. 1 is a perspective view of the heat tongue and holder of this invention;

FIG. 2 is an end view of the device of FIG. 1 taken along the line 2—2;

FIG. 3 is a cross-sectional view of the device shown in FIG. 2 taken substantially along the lines 3—3; and FIG. 4 is a further cross-sectional view of the device shown in FIG. 3 taken substantially along the lines 4—4.

DETAILED DESCRIPTION OF THE PREFERRED EMBODIMENT

As has already been explained, the present invention is related to a specific improvement in a heat tongue and holder therefor for use in conjunction with a package strapping machine adapted to form a heat seal in overlapping portions of plastic strap. Because a variety of such package strapping devices are well known in the art, a detailed description of such device will not be provided except in so far as is believed necessary to understand the present invention.

Referring to FIG. 3, a package strapping device to form a heat seal in overlapping portions of plastic strapping is shown in pertinent part. In particular, an upper pressure plate 10 is shown in side view together with a lower pressure plate 12. In conjunction with a device for which applicants' invention is ideally suited, the pressure plate 10 is vertically fixed during the strap heating and sealing operation and the lower pressure plate 12 is actuated by power means (not shown) to move upwardly to compress overlapping strap portions 14 and 16.

In the normal sequence of operation of such a device, a heat tongue is inserted between overlapping portions of the plastic strap 14 and 16 and then the lower pressure plate 12 is advanced upwardly toward upper pressure plate 10 to compress the overlapping strap portions 14 and 16 so that these strap portions 14 and 16 make contact with the heat tongue and thus heat up the strap portions. Subsequently, the lower pressure plate 12 is withdrawn slightly, the heat tongue is moved out of position between the overlapping strap portions 14 and 16, and then the pressure plate 12 is again advanced upwardly to compress the heated strap portions 14 and 16 so as to form a heat seal therebetween.

Referring now more specifically to applicants' invention as shown in FIGS. 1-4, a heat tongue 18 is provided having a first substantially flat run 20 and a second substantially flat run 22. The heat tongue is metal and in a preferred form may be formed of brass. The first run 20 is substantially rectangular as is the second run 22. The angle formed between the intersection of first run 20 with second run 22 is, in the preferred embodiment, a right angle. In one case, the heat tongue 18 was formed of brass approximately 0.082 inches thick with the first run forming a rectangle approximately 1½ inches by 0.935 inches, and the second run forming a rectangle approximately 3⅛ inches by 0.995 inches. A heat tongue holder 24 is also provided and adapted to slidably receive the heat tongue 18 as will be more fully explained.

The holder 24 includes a heat supply source (not shown) within the holder 24 which is adapted to radiate heat to the heat tongue 18 floatably mounted therein. Attached to the holder 24 is a means 26 for advancing the holder toward and away from the overlapping strap portion 14 and 16 to interpose the first run 20 between the overlapping strap portions 14 and 16. The means 26 includes parallel action linkage (not shown) adapted to advance and retract the holder 26 on a parallel action basis.

As best shown in FIG. 4, the holder 24 includes a recessed channel 28 defined therein. The recessed channel 28 is bounded on three sides by walls 30, 32 and 34 defined in the main body of the holder 24. On its fourth side, the channel 28 is defined by the inner surface 36 of a holder plate 38. The plate 38 is rigidly connected to the body of holder 24 by means of flathead machine screws 40. The channel 28 is defined so as to provide a cross-section as shown in FIG. 4 complementary to and slightly larger than the cross-section provided by the second run 22 of the heat tongue 18.

The position of the heat tongue 18 shown in the drawings FIGS. 1-4 is an extended position with the heat tongue 18 moved vertically upwardly so as to provide a better view of the heat tongue 18. In its normal, rest position the heat tongue 18 will slide downwardly vertically until the lower surface of the first run 20 abuts against the upper surface 42 of the plate 38. In this way, the plate 38 may be selected to have a geometry such that the upper surface 42 will provide the vertical predetermined rest position of the heat tongue 18 within the holder 24.

No additional means are required for connecting the heat tongue 18 to the holder and heater assembly 24 and the heat tongue 18 may simply be inserted into the channel 28 of the holder 24. Likewise, if maintenance or replacement of the heat tongue 18 is required, the heat tongue may merely be withdrawn from channel 28 without disconnecting or replacing any additional components of the assembly.

When the heat tongue 18 is in place within channel 28, it is heated by virtue of a heater assembly (not shown) contained within the holder 24 which radiates heat to the second run 22 of the heat tongue 18. Because the heat tongue 18 is metal, heat is then conducted throughout the heat tongue to the first run 20 thereof for operation to heat overlapping portions of the strap 14 and 16. When the heat tongue 18 is inserted into the channel 28, it moves downwardly to its fixed, predetermined position with the undersurface of the first run 20 abutting the upper surface 42 of the plate 38.

Since the advancing means 26 allows the holder to move in a parallel manner, the vertical location and attitude of the heat tongue 18 is maintained while the heat tongue 18 is being advanced to its heat seal position (i.e., interposed between overlapping strap portions 14 and 16). In this way the heat tongue is maintained in a desired attitude during the heating operation. For example, it is normally preferable to have the first run 20 of heat tongue 18 be maintained substantially parallel to the operating surfaces of pressure plates 10 and 12 to insure the most efficient operation.

After the holder 24 is advanced to have the first run 20 of the heat tongue 18 interposed between overlapping portions of the strap 14 and 16, the heat tongue 18 is free to vertically slide upwardly when the lower pressure plate 12 is advanced upwardly. In this fashion, no unnecessary shock or jarring is delivered to the holder 24 or to the associated heating assembly. Also, the plates are free to act on the heat tongue 18 to move it to the position where best contact of straps 14 and 16 is achieved. If the extended position of pressure plate 12 is varied, the free floating heat tongue 18 can accommodate the variance without any additional adjustment. In the preferred embodiment, the first run 20 is at a right angle with respect to the second run 22 of the heat tongue 18. In this fashion, the holder may be advanced with the parallel action linkage so that the first run 20 of the heat tongue 18 is maintained in a horizontal plane which is the same plane in which the cooperating surfaces of the upper and lower pressure plates are maintained.

While in the foregoing there has been described a presently preferred embodiment of the present invention, it is to be understood that this embodiment is merely illustrative of the invention and that modifications may be made thereto without departing from the true spirit and scope of that invention.

What is claimed is:

1. In an apparatus adapted to form a heat seal in overlapping portions of a plastic strap, the apparatus including a heat tongue holder, heater means within the holder for conducting heat to the heat tongue, means for advancing and retracting the holder toward and away from the overlapping portions of the plastic strap and means for compressing the overlapping portions of the strap during a heat seal operation, the compression means including relatively movable pressure plates to compress the overlapping portions of the plastic strap therebetween, an improved heat tongue and mounting therefor comprising, in combination:

a metal heat tongue having a first relatively flat run adapted to be interposed between overlapping portions of the plastic strap and a second relatively flat run forming an angle with respect to the first run, means for floatably mounting the heat tongue for sliding vertical movement within the heat tongue holder, the mounting means includng a recessed channel running through the holder from an upper portion thereof in a substantially vertical direction adapted to slidably receive the second run of the heat tongue, the recessed channel having a cross-section complementary to and just slightly larger than the cross-section of the second run of the heat tongue, the second run being inserted in the channel of the holder whereby the first run may abut an upper surface of the holder to limit further downward movement of the second run in the channel whereby the heat tongue is maintained in a fixed predetermined position in relation to the holder when the holder is advanced to interpose the first run between overlapping portions of the plastic strap and whereby the heat tongue is then free to slide upwardly with the upward movement of the lower pressure plate toward the upward pressure plate and to automatically return to its fixed predetermined position in the holder after the holder is withdrawn from proximity with the overlapping strap portions.

2. The invention as set forth in claim 1 wherein the holder includes a three-walled recess adapted to conform to the cross-section of the second run of the heat tongue and also includes an additional plate connectable to the holder to form the fourth wall of the channel with the upper surface of the plate forming a stop member for the vertical downward movement of the heat tongue with this stop member engagable against the undersurface of the first run of the heat tongue.

3. The invention as set forth in claim 1 wherein the angle between the first run and the second run of the heat tongue is a right angle.

4. In an apparatus adapted to form a heat seal in overlapping portions of a plastic strap, the apparatus including a heat tongue holder, heater means within the holder for transmitting heat to the heat tongue, means for advancing and retracting the holder toward and away from the overlapping portions of the plastic strap and means for compressing the overlapping portions of the strap during a heat seal operation, the compression means including an upper pressure plate and a lower pressure plate with the lower pressure plate adapted to be moved upwardly toward the upward pressure plate to compress the overlapping portions of the plastic strap therebetween, an improved heat tongue and mounting therefor comprising, in combination:

a metal heat tongue having a first and second run meeting at approximately right angles with respect to one another with one of the runs slidably located in a substantially vertical channel defined in the holder with the other run of the heat tongue engagable against an upper portion of the holder whereby downward sliding movement of the heat tongue is limited to fix the predetermined resting position of the heat tongue and whereby the heat tongue may be freely advanced upwardly by the lower pressure plate during a heat seal operation.

5. The invention as set forth in claim 4 wherein the holder includes a three-walled recess adapted to conform to the cross-section of the second run of the heat tongue and also includes an additional plate connectable to the holder to form the fourth wall of the channel.

6. The invention as set forth in claim 4 wherein said means for advancing and retracting the holder include parallel action linkage means for moving the holder in parallel planes.

7. The invention as set forth in claim 4 wherein the angle between the first run and the second run of the heat tongue is a right angle.

* * * * *